United States Patent [19]

Craggs

[11] 3,770,908

[45] Nov. 6, 1973

[54] MAGNETIC DISC RECORDER WITH A CARRIAGE FOR RECEIVING AND MOVING A CASSETTE INTO PLAYING POSITION

[75] Inventor: Lester R. Craggs, Nevada City, Calif.

[73] Assignee: Arvin Industries, Inc., Columbus, Ind.

[22] Filed: June 27, 1972

[21] Appl. No.: 266,613

[52] U.S. Cl. ..... 179/100.2 Z, 274/4 H, 340/174.1 C

[51] Int. Cl. .......................... G11b 5/56, G11b 23/04

[58] Field of Search ............ 179/100.2 Z, 100.2 CA, 179/100.2 P; 340/174.1 C, 174.1 F, 174.1 E; 274/4 H, 4 R, 11 A; 206/62 P

[56] References Cited

UNITED STATES PATENTS

| | | | |
|---|---|---|---|
| 3,593,327 | 7/1971 | Shill | 340/174.1 C |
| 3,432,169 | 3/1969 | Schroder | 179/1002. Z |
| 3,416,150 | 12/1968 | Lindberg, Jr. | 340/174.1 C |
| 3,635,608 | 1/1972 | Crouch et al. | 179/100.2 Z |
| 3,609,722 | 9/1971 | Zenzefilis | 179/100.2 Z |

*Primary Examiner*—Vincent P. Canney
*Assistant Examiner*—Alfred H. Eddleman
*Attorney*—Lawrence B. Biebel et al.

[57] ABSTRACT

A magnetic disc recorder is provided with an edge loading carriage having provisions to receive and locate a disc cassette relative to a drive hub. The carriage is movable between a loading position where cassette may be inserted or removed, and a playing position where the drive hub engages a complementary hub in the cassette and a transducer interfaces with the record disc in the cassette. The carriage includes a latch retaining the cassette in the operating position, and an ejector functioning to unload the cassette partially in the loading position.

5 Claims, 4 Drawing Figures

MAGNETIC DISC RECORDER WITH A CARRIAGE FOR RECEIVING AND MOVING A CASSETTE INTO PLAYING POSITION

CROSS REFERENCE TO RELATED APPLICATION

This application is related to copending U. S. application Ser. No. 266,582, filed June 27, 1972, entitled MAGNETIC DISC RECORDER AND MAGNETIC DISC CASSETTE, which is assigned to the assignee of this application.

BACKGROUND OF THE INVENTION

This application relates to magnetic disc recorders, and particularly to such recorders of the type in which a thin relatively flexible record disc is housed within an inexpensive cassette, which can readily be loaded and unloaded from the recorder. In the loaded position the cassette and the record disc therein are properly indexed to interface with a transducer for recording or reproduction. Many magnetic disc recorders are in use, predominantly of the so called "memory disc" type employed in conjunction with digital computers and equipment of that type. The discs are generally a rather brittle magnetizable coating on a rigid plate or platter, one or more of which may be supported fixed to a drive spindle, retained within a rather complex housing, which may include various seals and the like to minimize access of dirt into the chamber.

Some efforts toward a simplified disc cassette recorder have been made, notably as disclosed in U. S. Pat. No. 3,416,150, issued Dec. 10, 1968 to Charles A. Lindberg, Jr., and U. S. Pat. No. 3,609,722, issued Sept. 28, 1971 to George E. Zenzefilis. In each case, however, the magnetic record disc contained within the cassette is of the rigid type, and rather elaborate seals are provided between the magnetic record disc, particularly surrounding its central hub, and the members of the cassette, again to provide seals against dust, dirt, etc. Also, rather elaborate sealed shutters and the like are provided for opening to allow access of the transducer to the record disc. These rather complicated disc cassette constructions are in turn provided with rather elaborate drive connections to a drive motor, the entire mechanism being expensive and somewhat involved in operation.

There is a demand for a simplified, inexpensive magnetic disc recorder, and the general type of such recorder is disclosed in the aforementioned U. S. Pat. application Ser. No. 266,582. That application in particular also discloses an inexpensive practical disc cassette construction with a simplified drive arrangement. The present invention deals with the carriage which provides for edge or slot loading of the disc cassette in such a recorder.

SUMMARY OF THE INVENTION

The present invention relates to a slot-loading magnetic disc cassette recorder, in which a movable carriage is provided with a cavity of rather thin cross-section, shaped to receive an appropriate disc cassette, which may conveniently be of a thin generally rectangular shape, containing a thin flexible magnetic record disc having a hub accessible to the exterior of the cassette and adapted for driving by a complementary drive hub in the recorder. The carriage is movable, preferably about a hinge access, between a loading position in which the disc cassette can be inserted into the carriage cavity from the exterior of the recorder housing, and a playing position in which the driven hub of the record disc is brought into contact with the drive hub of the recorder. At the same time, in the playing position an access opening in the cassette is made accessible to a transducer which is movable to follow different circular paths, or a helical path, over the active recording portion of the recording disc.

The carriage includes a cooperating latch which will retain the disc cassette properly indexed with reference to the drive hub and the transducer when the carriage is moved to the playing position. The carriage is spring loaded toward the loading position, and includes an appropriate latch to retain it in the playing position. In the loading position, ejector mechanism in the carriage presses against the cassette tending to move it partially out of the carriage and through a loading opening in the housing, where it can readily be grasped for removal or insertion.

The primary object of the invention, therefore, is to provide a novel simplified loading and unloading system, including a simple hinge mounted carriage, for receiving a magnetic disc cassette and positioning such cassette properly to interface with a magnetic transducer, and to contact with a drive for rotating the record disc; and to provide such an arrangement wherein the carriage includes ejector mechanism for partially ejecting the disc cassette when the carriage is in the loading position; and to provide latching and registering devices which locate the disc cassette, and the record disc therein accurately with respect to the drive hub of the recorder and with respect to the transducer, in the playing position.

Other objects and advantages of the invention will be apparent from the following description, the accompanying drawings and the appended claims.

DESCRIPTION OF THE PREFERRED EMBODIMENT

Figure 1:
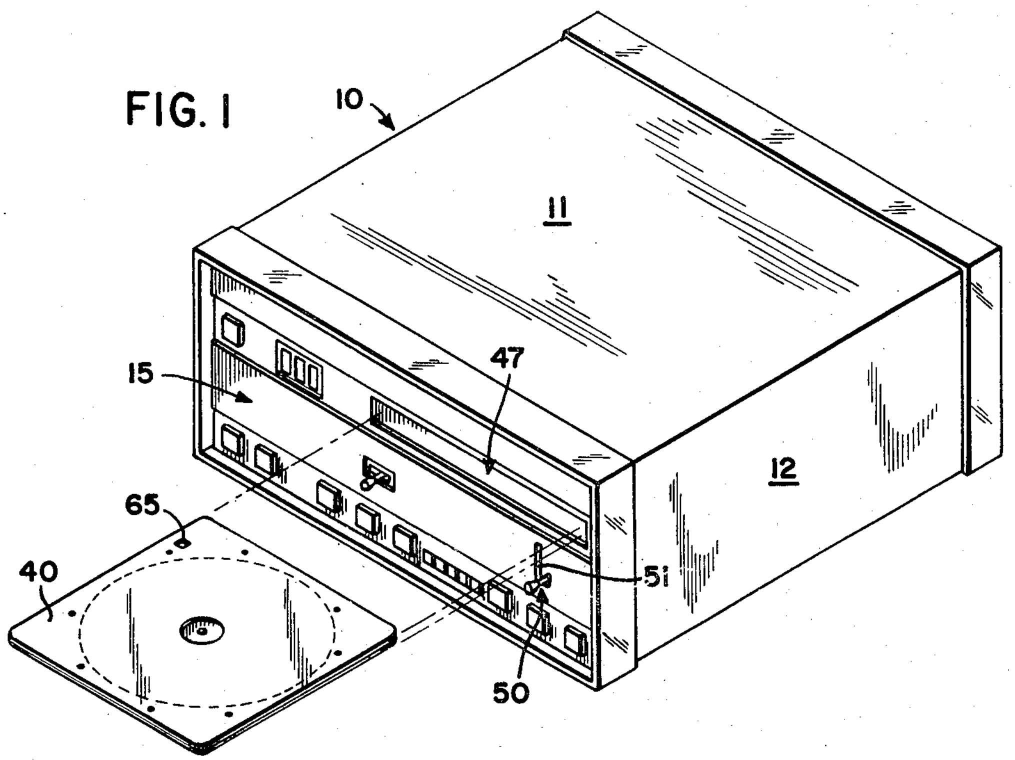
FIG. 1 is a perspective view of a magnetic recording system embodying the invention, showing a cassette which contains a recording media in position to be loaded into the housing of the device.

Referring to the drawings, and particularly to FIGS. 1–4, the recording system provided by the invention is contained within a housing 10 having a top 11, sides 12, a rear panel 14 and a front panel or face 15. Within this structure there is fastened an inner mounting bracket 16 which is generally U-shaped in configuration, with its base portion resting behind the front panel 15, one of its sides adjacent to one side panel 12, and the other of its sides extending front to back of the housing between the sides forming a partial partition. A base panel 18 is secured to all three sides of the bracket 16 and is supported within the housing elevated somewhat above its bottom.

The base panel 18 provides support for a drive motor 20 having an output shaft 21 which extends vertically, its axis of rotation being generally parallel to the front and rear of the housing. Attached to the motor shaft 21 is a tachometer 22 which forms part of a control loop to regulate the motor output speed. Above the tachometer, also fastened to shaft 21, there is a flywheel 24, and immediately above it is the output or drive hub 25. The end of shaft 21, in the particular construction shown, extends somewhat through the drive hub and provides a locating means 26 which functions to align the drive hub with elements to be driven. The top or upper face of drive hub 25 has a plurality of radially extending undercut teeth 28 which face coaxially of the shaft 21 arranged in a circle around the face of drive hub 25. These teeth rotate in a fixed plane when motor 20 is running, and the elements of a recording cassette are brought into contact with the drive hub, as will be explained.

Immediately above the motor and its drive hub there is a cassette receiving carriage 30 which comprises top and bottom walls 31 and 32 secured together to define a thin elongated chamber 35 into which a thin rectangular cassette 40 may be inserted. Details of the cassette are described in the aforementioned copending U. S. application Ser. No. 266,582. For purposes of the present explanation, it should be noted that the cassette includes an exposed rotatable driven hub 42, also having undercut teeth 43, the driven hub constructed as a complement to the driving hub 25 so that the two hubs may readily engage for the purpose of moving a recording media within the cassette 40. In one successful embodiment, the cassette 40 was constructed as a hollow essentially rigid member of about 10 inches square, having a thickness of less than one-fourth inch.

The carriage 30 has a drive access opening 44, and is supported at its rear by a pivot or hinge rod 45 which extends through suitable bushings 46 in the sides of the support bracket 16. This supports the carriage for pivotal movement between a playing position which is shown in full lines in FIG. 2, and a loading or unloading position shown in dash lines, where the cassette receiving chamber 35 is generally aligned with a loading opening 47 in the front panel 15. In the playing position an upward extension 48 of the carriage top wall 31 provides a cover for the opening 47. A control handle 50 extends through a slot 51 in front panel 15 and is fastened to a small bracket 53 on the bottom wall 32 of the carriage. Leaf spring 55, which is fixed to the base panel 18, presses against the underside of carriage 30, urging it toward the loading position. The slot 51 includes a lateral extension into which a portion of the handle 50 can engage, locking the carriage in the playing position.

A retaining mechanism functions to locate the cassette in the chamber 35 against the force of an ejector spring 60 which is secured to the rear of carriage 30 and includes a portion 61 projecting into the rear of the chamber 35 to engage and press against an edge of the cassette 40. The retainer mechanism includes a latch 62 having a corner 64 (FIG. 4) which is normally urged through an opening in the upper wall 31 of the carriage to engage within a notch 65 formed in the cassettes 40. The latch member 62 is mounted on a pivot pin 67 which in turn is supported on a mounting block 68 fastened to the top wall 31 of the carriage. A small leaf spring (not shown) is secured within the mounting block 68 and presses against the pivoting latch member 62, urging it into the retaining position shown in FIG. 4.

The upper panel 70, which is supported beneath the top 11 of the housing, has a depending stop 72 aligned with the latch member 62 such that when the carriage is raised to the loading position, the latch member 62 will engage stop 72, pivot against the leaf spring, and move the end 64 out of the notch in the cassette, permitting the ejector spring 60 to eject the cassette partially through the loading opening 47 as the open front end of the carriage comes into alignment with the loading opening. To reverse the procedure for loading, it is necessary only to hold the cassette in the chamber 35 as the carriage begins to be lowered, and the retainer mechanism will engage the notch 65 as the carriage leaves the loading position.

Figure 2:
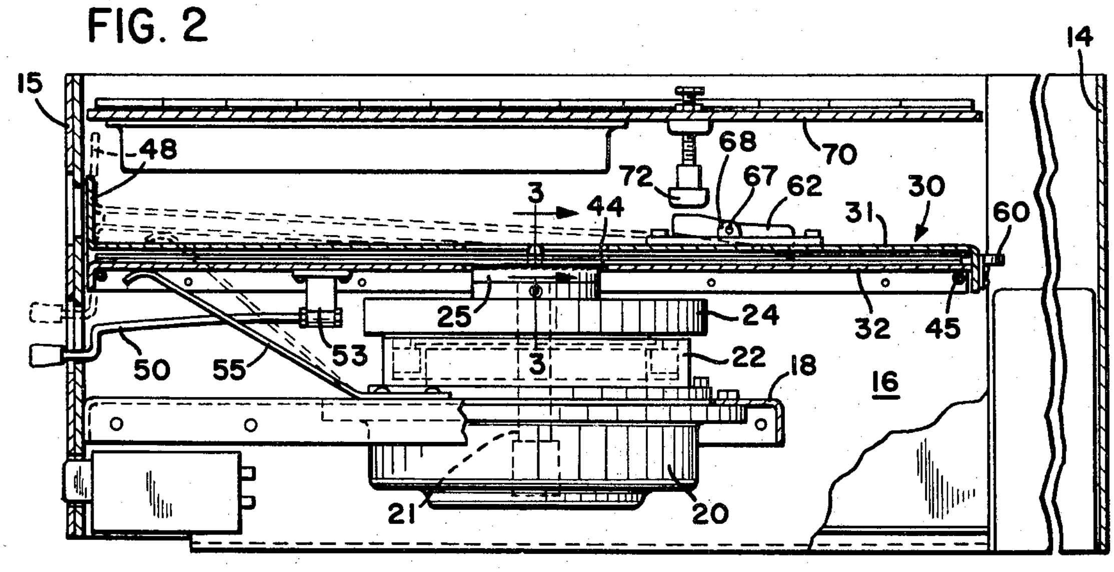
FIG. 2 is a cross-sectional view taken generally through the center of the housing, with some parts broken away or omitted for purposes of clarity.
Figure 3:
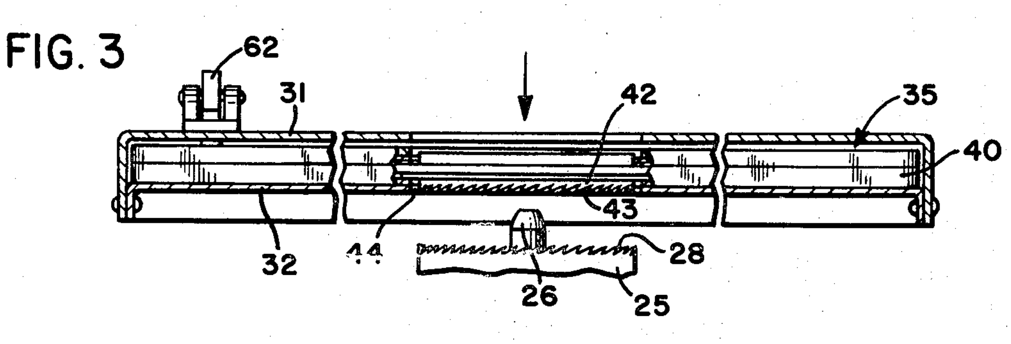
FIG. 3 is a cross-sectional view of the cassette carriage and related portions of the drive, taken on line 3—3 in FIG. 2.
Figure 4:
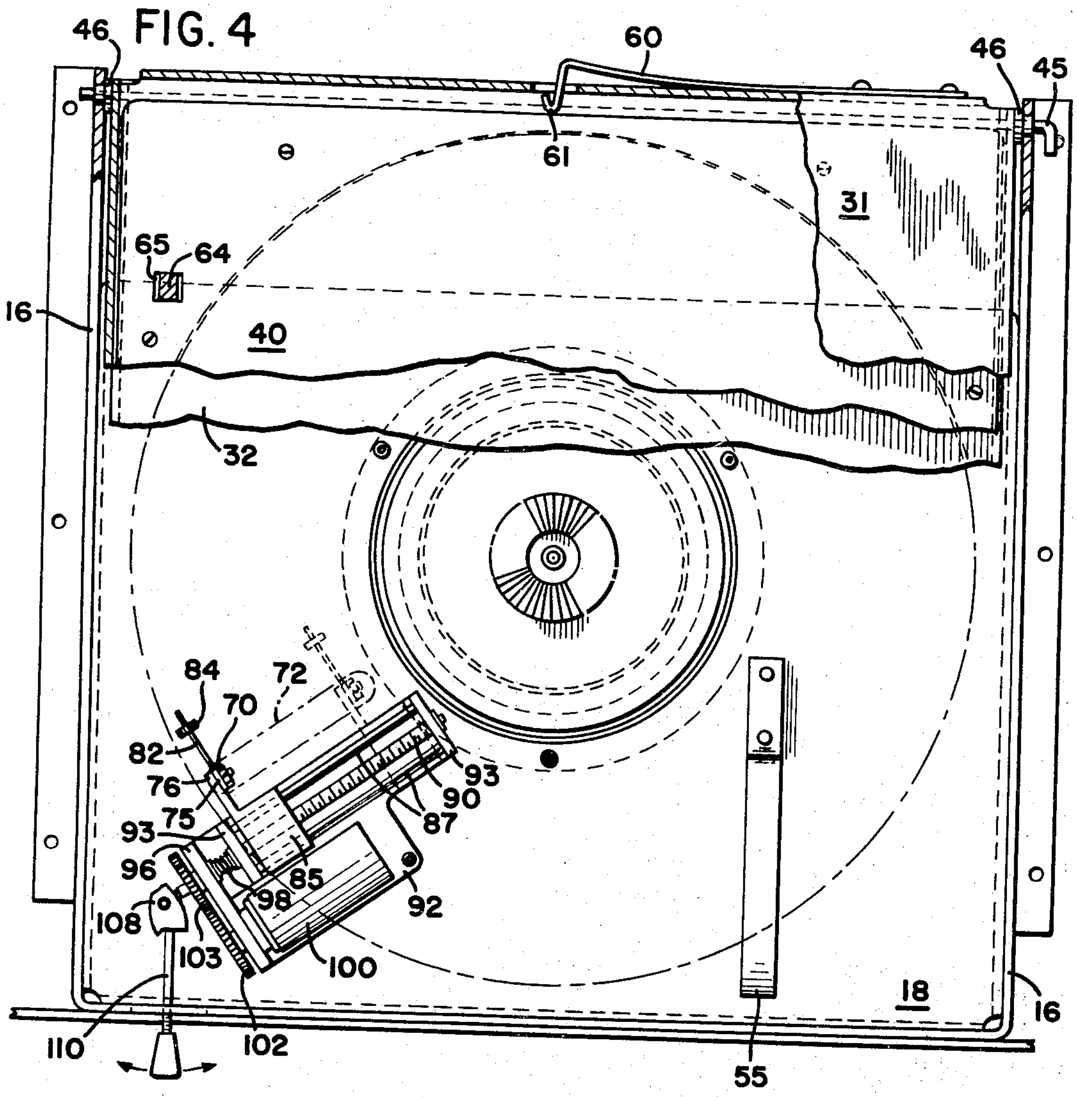
FIG. 4 is a plan view of the central portion of the carriage and drive mechanism, with portions of the carriage and of the cassette broken away to show the face of the drive hub and the general arrangement of the tranducer mounting and controls.

Referring to FIG. 4, a transducer 70, preferably in the form of a single magnetic recording/playback head having a very narrow width and a small gap width in the order of 40 microinches, is mounted for cooperation through elongated openings in the carriage and the cassette in the region shown at 72 in FIG. 4, with the recording media within the cassette 40 when the carriage supports the cassette in the playing position as shown particularly in FIG. 2. The transducer 70 is suitably arranged for interchangeable mounting on a supporting slide 75 that is vertically movable within a support 76, being guided for strict vertical movement.

A pin (not shown) extends from a lower portion of slide 75 through an aperture in the support, and in position to engage one end of a control arm 82. This arm is pivotally mounted to the support 76, and a counterweight 84 is threaded into the outer end of the arm 82. Adjustment of the counterweight toward and away from the slide determines the force with which the transducer 70 is urged upward to interface with the recording media in the cassette.

The entire transducer holding mechanism is supported for movement in a direction radially of the cassette by means of a main supporting block 85 to which the support 76 is fastened. This block contains suitable holes which are received into parallel guide rods 87 that support the block 85 for precise sliding movement. A lead screw 90 is threaded to a nut (not shown) fixed within the block 85, such that rotation of the lead screw produces a translational movement of the block 85 radially of the carriage 30 (and a cassette therein) as shown generally in FIG. 4. The transducer and its supporting mechanism is shown in full lines in the outermost position and in dash lines in the innermost position, indicating generally the range of movement of the transducer.

The rods 87 and lead screw 90 are supported parallel to each other on a bracket 92 which includes a pair of upstanding ears 93 to which opposite ends of the rods 87 are secured. The lead screw 90 is mounted within bushings within these ears, and extends through a further bushing at the outermost end of the bracket, that bushing being supported within a further upstanding ear 96.

The lead screw is supported for limited longitudinal movement within the bushings, being shown in its outermost position where a spring 98 presses against a snap ring on the lead screw, biasing it to that position.

A stepping motor 100 is supported on the bracket to one side of the rods and block 85, and is connected to rotate the lead screw through a pair of meshing gears 102 and 103, the former of which is fixed to the output shaft of the stepping motor, while the gear 103 is fixed to the end of the lead screw 90. Te tip 105 of the lead screw projects beyond gear 103 and engages with an adjustment cam 108 which is rotatably mounted on the base panel 18. An adjustment arm 110 extends from cam 108 through an aperture in the front panel 15 (and a corresponding aperture in the front of bracket 16) to control rotation of cam 108, which in turn passes against the end of lead screw 90 and provides a fine adjustment of the position of block 85 and the transducer mechanism.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A cassette type disc magnetic recorder comprising a housing, a motor having a drive hub rotatable about a predetermined axis in said housing, a carriage movably mounted in said housing between a playing position adjacent said hub and a loading position spaced from said hub, said carriage having a cavity including guide means to receive and to position a cassette containing a magnetic record disc with a driven hub for engagement with said drive hub in said playing position, a transducer mounted in said housing adjacent the playing position of said carriage to interface with a recording disc in a cassette received in said guide means, said carriage being adapted in said loading position to receive a cassette into said guide means of said carriage, a latch on said carriage arranged to engage the cassette in the playing position and to index the cassette for proper alignment of the hubs and of said transducer with respect to the record disc, and actuator means for moving said carriage between the loading position and the playing position.

2. A recorder as defined in claim 1, including a hinge connected between said housing and said carriage to define the motion of said carriage between the loading and playing positions.

3. A cassette type disc magnetic recorder comprising a housing including a support plate, a motor mounted on said plate and having a drive hub rotatable about a predetermined axis, a carriage movably mounted in said housing between a playing position adjacent said hub and a loading position spaced from said hub, said carriage having guide means to receive and to position a cassette containing a magnetic record disc with a driven hub for engagement with said drive hub in said playing position, a loading opening in said housing located at one end of said carriage in said loading position to pass a cassette into said guide means of said carriage, actuator means attached to said carriage for moving it between the loading position and the playing position, a transducer mounted in said housing adjacent the playing position of said carriage to interface with a recording disc in a cassette received in said guide means, an ejector in said carriage operative against a cassette received in said guide means tending to hold the cassette partially out of said loading opening in the loading position of said carriage, and retainer mechanism cooperating with said carriage to locate a cassette in said carriage at the playing position.

4. A recorder as defined in claim 3 wherein said drive hub is supported in a fixed position with its axis of rotation generally intersecting the center of said carriage, a hinge connected between said housing and the other end of said carriage opposite said loading opening whereby said carriage swings about said hinge between its loading and playing positions, and said actuator means including an arm attached to said carriage and extending to the exterior of said housing.

5. A recorder as defined in claim 3, including spring means urging said carriage to the loading position, and said actuator means including a latch to retain said carriage in the playing position.

* * * * *